(12) United States Patent
Wada et al.

(10) Patent No.: US 10,663,670 B2
(45) Date of Patent: May 26, 2020

(54) OPTICAL CONNECTOR

(71) Applicant: Konica Minolta, Inc., Tokyo (JP)

(72) Inventors: Kazuhiro Wada, Tokyo (JP); Yasushi Mizumachi, Tokyo (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 15/978,597

(22) Filed: May 14, 2018

(65) Prior Publication Data

US 2018/0335573 A1 Nov. 22, 2018

(30) Foreign Application Priority Data

May 17, 2017 (JP) .................................. 2017-097974

(51) Int. Cl.
*G02B 6/32* (2006.01)
*G02B 6/38* (2006.01)
*G02B 1/04* (2006.01)

(52) U.S. Cl.
CPC ............. *G02B 6/32* (2013.01); *G02B 6/3818* (2013.01); *G02B 6/3853* (2013.01); *G02B 6/3882* (2013.01); *G02B 6/3885* (2013.01); *G02B 1/041* (2013.01)

(58) Field of Classification Search
CPC ......... G02B 6/32; G02B 6/3818; G02B 1/041
USPC ......................................................... 385/33
See application file for complete search history.

(56) References Cited

U.S. PATENT DOCUMENTS

| 2002/0131701 A1* | 9/2002 | Zhu | G02B 6/32 385/33 |
| 2003/0152326 A1* | 8/2003 | Morimoto | G02B 6/266 385/34 |
| 2011/0181943 A1* | 7/2011 | Murai | H04B 10/299 359/337.2 |
| 2013/0114927 A1* | 5/2013 | Smith | A61F 9/00823 385/35 |
| 2015/0139590 A1* | 5/2015 | Oniki | G02B 6/4249 385/79 |

FOREIGN PATENT DOCUMENTS

JP 2016-133518 A 7/2016

OTHER PUBLICATIONS

"Micro Lens Array Structure for Low Power Optical Interconnect" at 2014 Japan Society of Applied Physics, in the 75th Japan Society of Applied Physics autumn academic lecture meeting, collection of lecture drafts (19a-C7-6); Hidetoshi Numata (1 page).

* cited by examiner

*Primary Examiner* — Jerry M Blevins
(74) *Attorney, Agent, or Firm* — Osha Liang LLP

(57) ABSTRACT

An optical connector for connecting single mode optical fibers includes a ferrule that connects to and holds an optical fiber, and a resin optical element coupled to the ferrule and that includes a lens positioned relative to an end of the optical fiber held in the ferrule, and the lens is provided with an antireflection structure. When the optical connector is oppositely connected to another identical optical connector, the opposing optical elements are disposed such that a diverging light is emitted from the end of the optical fiber, transmitted through the lens, and emitted as a collimated beam of light, and the collimated beam of light is incident on an opposing lens of the opposing, identical optical connector and condensed onto an end of an opposing optical fiber of the opposing, identical optical connector.

5 Claims, 8 Drawing Sheets

OPTICAL CONNECTOR

TECHNICAL FIELD

The present invention relates to an optical connector suitably used, for example, for optical communication.

BACKGROUND

In various information/signal processing equipment including a network apparatus such as a router, a server, and a host computer, an information/signal processing is under a process of large-scaling and improved in a speed. In such equipment, signal has been conventionally transmitted by electric wirings between CPUs and memories on circuit substrates (boards), between wiring substrates, and between apparatuses (racks). However, from the superiority in view of transmission speed, data transmission capacity, power consumption, radiation from a transmission path, and interference of electromagnetic wave to the transmission path, so-called optical interconnection is actually beginning to be introduced, which transmits the signal by light using an optical fiber or the like as the transmission path, instead of the above mentioned electric wiring. In the optical interconnection, an optical connector has been used for optical coupling of the optical fibers. The typical optical connector has a lens in which the light emitted from an end of one optical fiber is condensed to an end of other optical fiber.

By the way, an amount of the optical communication information rapidly increases in recent years, in addition, long-distance and high-speed transmission of the information are desired. However, in the case of multimode fiber having been conventionally used, the optical fiber having core diameters of 50 µm and 62.5 µm are adopted. Since the multimode fiber transmits the optical signal in a plurality of modes, there is a shift between the attainment times of the signals, resulting in generation of modal dispersion. Thus, due to data loss caused by modal dispersion, the multimode fiber is considered as unsuitable for the long-distance and high-speed transmission.

On the other hand, single mode fiber is an optical fiber having an extremely fine diameter of which a mode field diameter is about 9 µm, and it has an advantage capable of suppressing attenuation as much as possible by transmitting an optical signal in one mode. Accordingly, the single mode fiber has been often used because the attainment time of signal is single, which is different with the transmitting process using many modes such as multimode fiber, thus generating no mode loss, and is suitable for the long-distance and high-speed transmission.

However, the single mode fiber involves one subject due to the small mode field diameter of about 9 µm. That is, when the optical fibers are optically coupled using the optical connector, the allowance of core offset is narrowed. Particularly, the core offset can be caused by a change of environmental temperature. Hereinafter, detail thereof will be explained.

In the typical optical connector, multicores optical fiber bodies composed of a plurality of cores bundled are often coupled for the purpose of increasing the information amount. The optical connector used for such application typically has a holding member to hold the multicores optical fiber body which is called as a ferrule, and an optical element arranged between a pair of ferrules, which has a lens formed for transmitting light effectively between a plurality of core ends held in the ferrule.

However, even if the optical fibers are coupled with high accuracy using the optical connector at normal temperature, a thermal expansion difference may occur in each part by change of the environmental temperature, which may result in an increased loss by the core offset or the like. Here, the optical fiber is made of glass, and the ferrule is often molded from the resin mixed with the glass fiber. The resin mixed with the glass fiber has a characteristic that a coefficient of linear expansion thereof is near to that of the glass, so that the difference of thermal expansions hardly arises. On the other hand, a predetermined optical characteristic is required for the optical element, and hence, depending on the selected material of the optical element, a thermal expansion difference may occur between the optical element and the ferrule. As a countermeasure, in the case of the lens being produced by glass, for example, the coefficient of linear expansion of the lens glass is near to that of the optical fiber and the ferrule, which is costlier.

On the other hand, as disclosed in Patent Document 1, the optical element is produced by resin containing glass fiber, thereby to suppress the linear expansion difference between the optical element and the ferrule, which can suppress the efficiency loss on change of the environmental temperature. However, in the material produced by containing the glass fiber to the resin, there exists a technical difficulty to match the refractive index and the temperature characteristic to a level satisfying the optical characteristic. Also, the resin is generally colored by mixing the glass fiber, which may reduce the optical transmittance. Therefore, it is difficult to use the resin containing the glass fiber for the optical element used for optical connector.

Patent Literature

PTL 1: JP2016-133518 A

Non-Patent Literature

NPL 1: "Micro Lens Array Structure for Low Power Optical Interconnect" at 2014 Japan Society of Applied Physics, in the 75th Japan Society of Applied Physics autumn academic lecture meeting, collection of lecture drafts (19a-C7-6) by Hidetoshi Numata et al.

On the other hand, Non-Patent Document 1 discloses improvement of light use efficiency achieved by providing an antireflection film of low refraction onto a lens surface, but mere provision of the antireflection film of low refraction on the lens surface cannot prevent the core offset in the optical connector on change of the environmental temperature.

SUMMARY

One or more embodiments of the present invention provide an optical connector capable of suppressing the loss on change of the environmental temperature with achieving cost reduction.

In order to realize at least one of the above-mentioned object, an optical connector reflecting one or more aspects of the present invention is an optical connector for connecting optical fibers for single mode in light transmissive way, including:

a ferrule to which the optical fiber is connected to hold the optical fiber, and an optical element of resin and coupled to the ferrule, having a lens positioned relative to an end of the optical fiber held in the ferrule, wherein where a coefficient of linear expansion of the ferrule is indicated as A (PPM/° C.), and a coefficient of linear expansion of the optical element is indicated as B (PPM/° C.), a following formula is satisfied, $$0 < B - A \leq 20 \quad (1)$$

at least the lens is provided with an antireflection structure, when a pair of the optical connectors is disposed oppositely, the optical elements are opposed so that a diverging light emitted from an end of the one optical fiber is incident to the one lens to emit a collimated light, the collimated light is incident to the other lens and is condensed on the end of the other optical fiber.

According to one or more embodiments of the present invention, the optical connector can be provided which can suppress the loss on change of the environmental temperature and achieve cost reduction.

DETAILED DESCRIPTION

Figure 1:
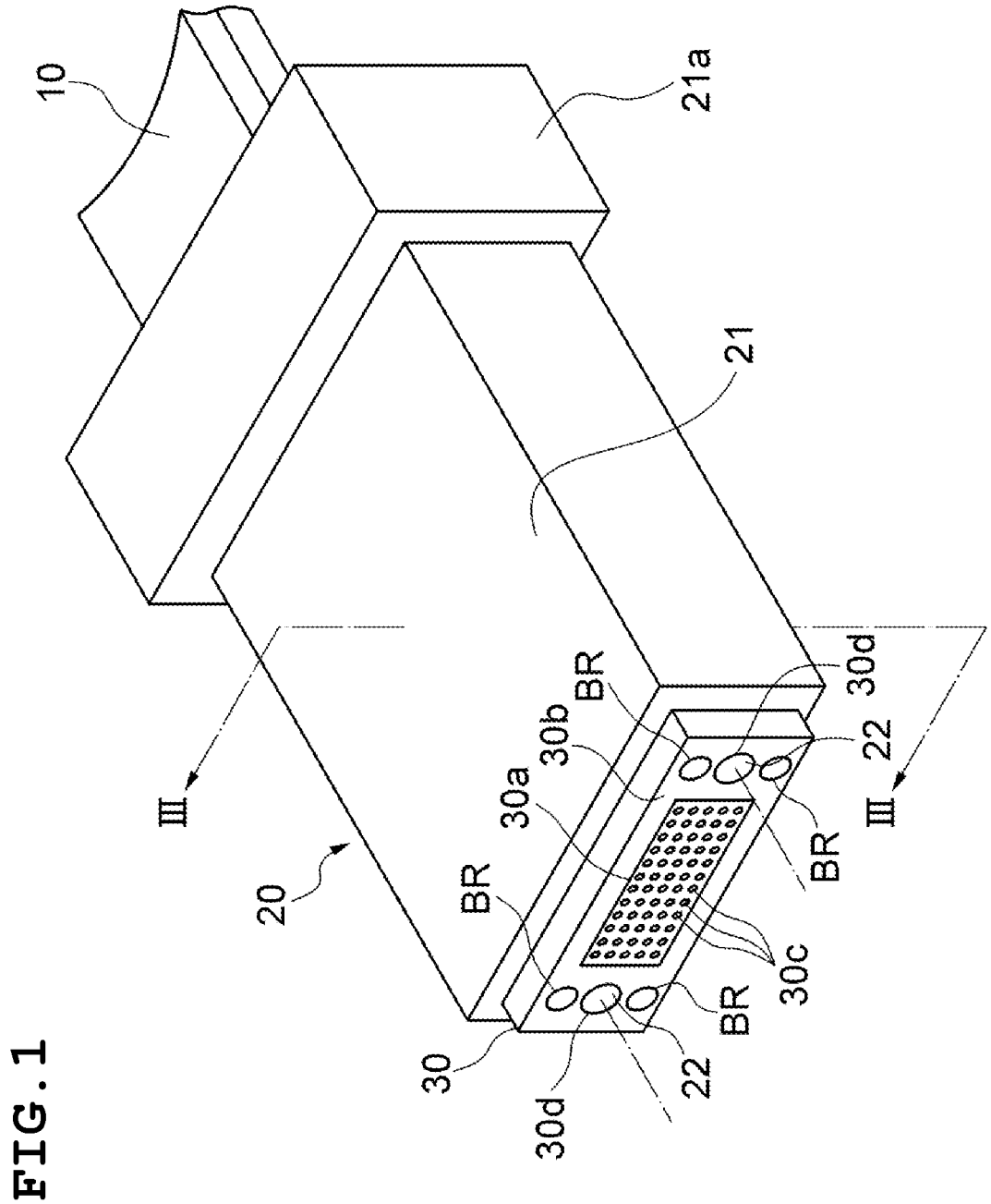
FIG. 1 is a perspective view of an optical connector according to one or more embodiments.
Figure 2:
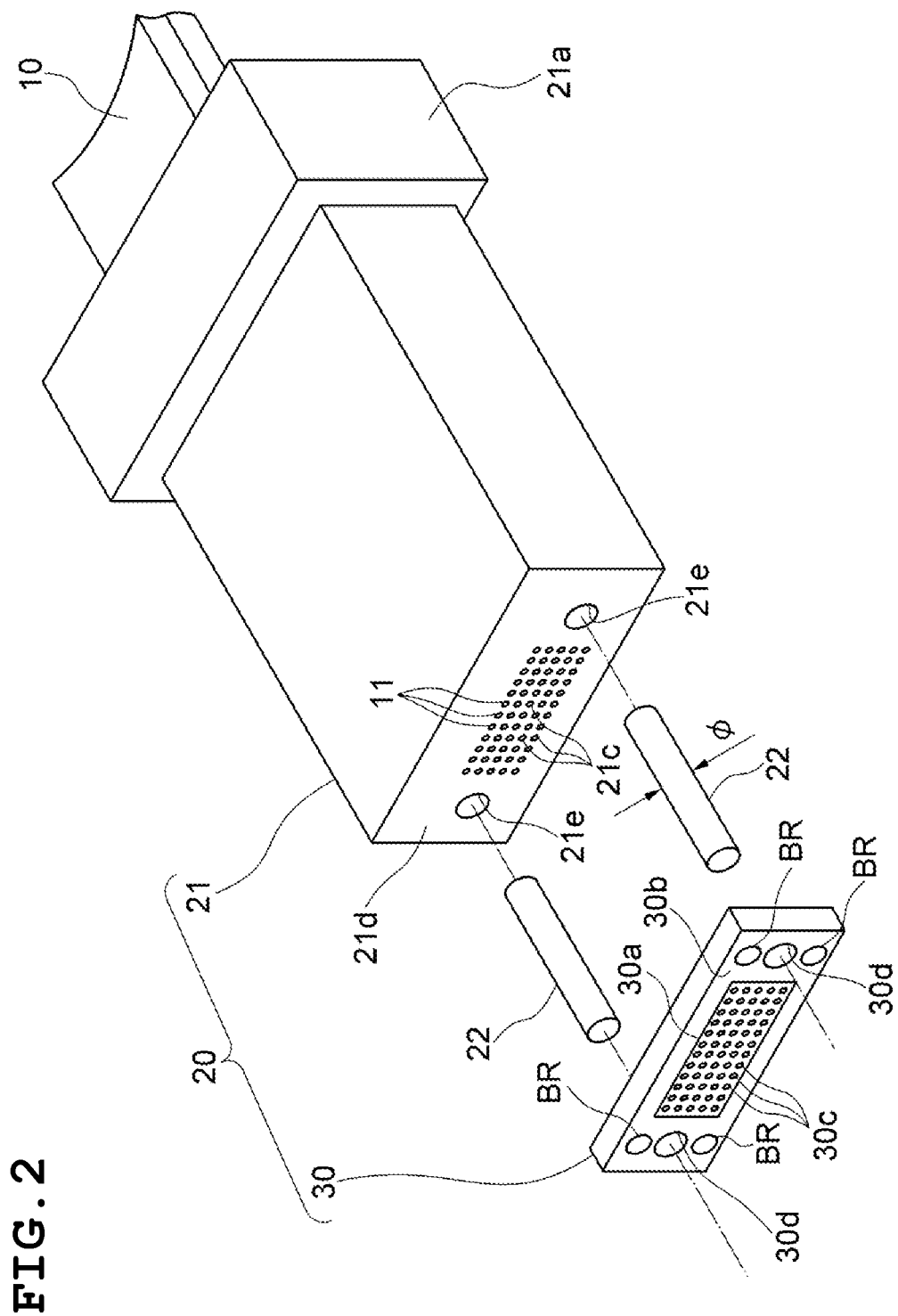
FIG. 2 is an exploded view of the optical connector according to one or more embodiments.
Figure 3:
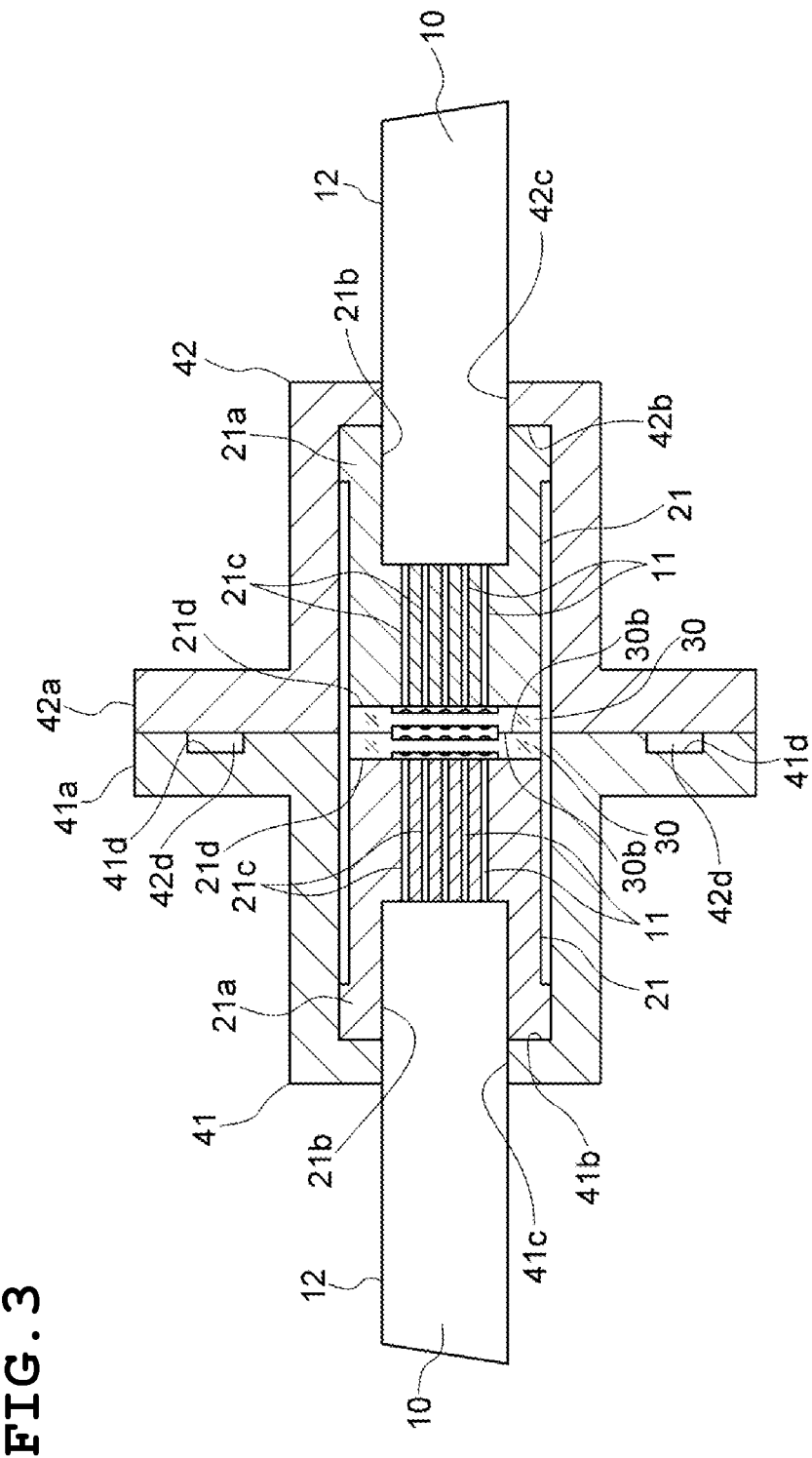
FIG. 3 is a sectional view of a pair of optical connectors connected using a coupler according to one or more embodiments, taken along a vertical plane passing a line III-III, and viewed along arrows in FIG. 1.
Figure 4:
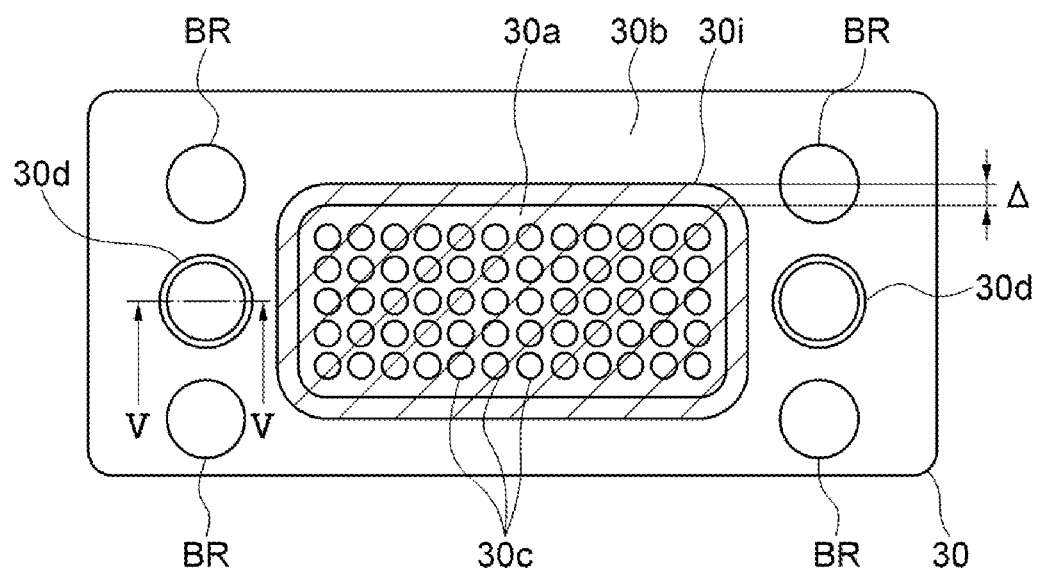
FIG. 4 is a front view of a lens plate 30 according to one or more embodiments.
Figure 5:
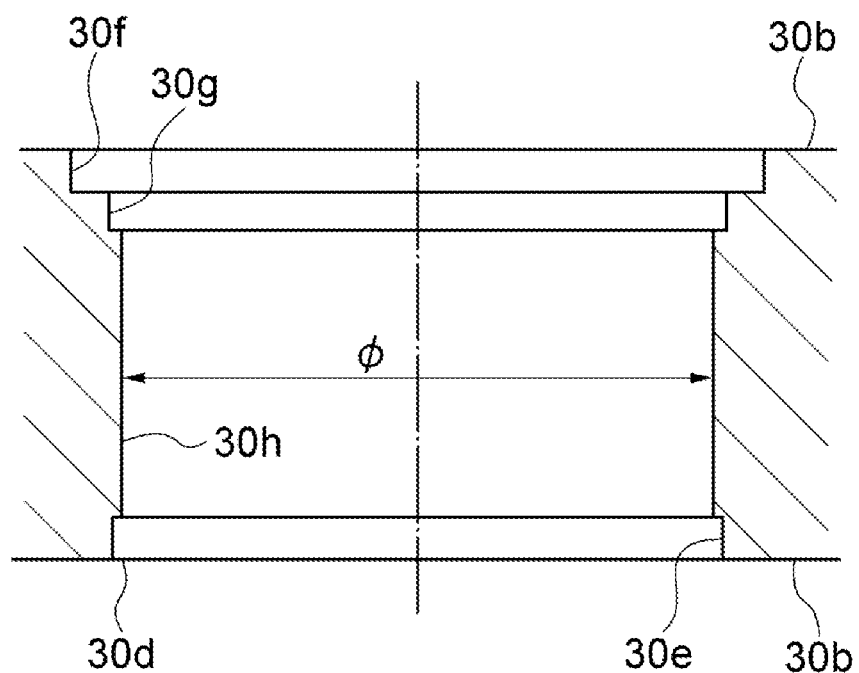
FIG. 5 is an enlarged sectional view of a configuration according to one or more embodiments taken along a line V-V, and viewed along arrows in FIG. 4.

Hereinafter, embodiments of the present invention will be explained with referenced to drawings. FIG. 1 is a perspective view of an optical connector according to one or more embodiments. FIG. 2 is an exploded view of the optical connector according to one or more embodiments. FIG. 3 is a sectional view of a pair of optical connectors connected using a coupler according to one or more embodiments, taken along a vertical plane passing a line III-III, and viewed along arrows in FIG. 1. FIG. 4 is a front view of a lens plate according to one or more embodiments. FIG. 5 is an enlarged sectional view of a configuration according to one or more embodiments taken along a line V-V, and viewed along arrows in FIG. 4. A pair of optical connectors 20 are coupled by abutment to transmit an optical signal between the optical cables 10.

In FIG. 1, the optical connector 20 coupled to the optical cable 10 having many cores (here, sixty cores) has a ferrule 21 and a lens plate 30 which is an optical element. The ferrule 21 made of a thermosetting resin containing glass fibers has a shape of substantially rectangular solid, and includes an enlarged part 21a at an end to which the optical cable 10 is coupled. The optical cable 10 has sixty optical fibers 11 composed of core and clad and a covering part 12 protecting the optical fiber 11 (refer to FIG. 3).

As shown in FIG. 3, each enlarged part 21a is provided with, at an inner part thereof, an end hole 21b to which the end of the optical cable 10 is inserted. A plurality of through holes 21c are formed so as to extend from a bottom of the end hole 21b in a longitudinal direction of the ferrule 21, and the optical fibers 11 extended from an interior of the optical cable 10 are held in the through hole 21c. The optical fiber 11 is for single mode, and as shown in FIG. 2, a tip thereof is exposed on an end face 21d opposite to the enlarged part 21a.

In FIG. 2, circular openings (holes) 21e are formed at both sides in the crosswise direction of a group of the through holes 21c where the tips of the optical fibers 11 are exposed. Round shafts (projection parts) 22 are inserted into the circular openings 21e in parallel each other, and each round shaft 22 has a tip projected from the end face 21d.

In FIGS. 2 and 4, the lens plate 30 of rectangle plate shape has a rectangular concave part 30a recessed in centers of a front face and a back face, and a contact face 30b formed around the concave part 30a. In each concave part 30a, lens faces 30c with five lines and twelve rows arrangement are formed, and opposing lens faces 30c on the front face and back face have biconvex shapes of which optical axes are coincided to constitute the lens. At both sides of the concave portion 30a in the crosswise direction, circular holes 30d are respectively formed. At both sides of the circular holes 30d in the vertical direction, circular impressions BR are formed on releasing step of mold after molding the lens plate 30, which will be explained later.

As shown in FIG. 5 the circular holes 30d includes a first annular part 30e located at one side (lower side in FIG. 5) of the contact face 30b, a second annular part 30f and a third annular part 30g both located at other side (upper side in FIG. 5) of the contact face 30b, and a cylinder part 30h formed between the third annular parts 30g and the first annular parts 30e. The third annular part 30g and the first annular part 30e respectively have diameters larger than the diameter φ (=0.7 mm) of the cylinder part 30h. Further, the second annular part 30f has a diameter larger than a diameter of the third annular part 30g. The diameter φ of the cylinder part 30h is equal to the diameter φ of the round shaft 22 (refer to FIG. 2).

The first annular part 30e, the second annular part 30f and the third annular part 30g are thus provided for the reason to fit the round shaft 22 to only the cylinder part 30h having comparatively short length on fitting to the circular hole 30d. In other words, in order to fit the round shaft 22 to the circular hole 30d with high accuracy, it is enough to form only the cylinder part 30h having short length with high accuracy, contributing to cost reduction.

An antireflection film 30i as antireflection structure is formed in each concave part 30a located in the centers of the front face and the back face of the lens plate 30, and a part of the contact face 30b located therearound, as shown by hatching in FIG. 4. A distance Δ between a periphery of the antireflection film 30i and a periphery of the concave portion 30a is desirably 100 μm or less, for example, however, the distance may be zero. The antireflection film 30i is provided in such area, whereby even if the antireflection film is peeled, its propagation stops at the edge position of the concave part 30a to be prevented from reaching the lens face 30c. The antireflection film 30i is formed to avoid the position of the circular hole 30d, because when the round shaft 22 is inserted into the circular hole 30d, there is possibility that the antireflection film is peeled off to lower the positioning accuracy thereof.

Figure 6A:
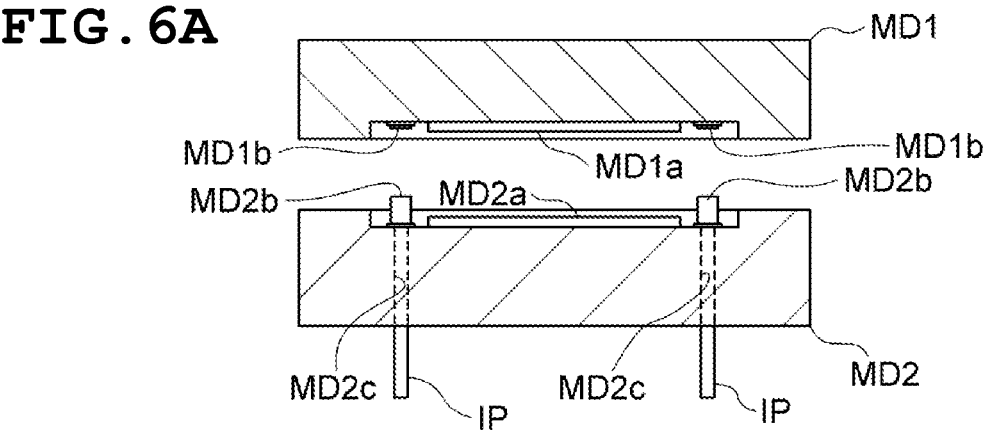
FIGS. 6A, 6B, and 6C are views showing molding steps of the lens plate according to one or more embodiments.

Next, molding step of the lens plate 30 will be explained. FIG. 6 shows the molding step of the lens plate 30, with omitting lens and lens transferring face. FIG. 7 is a perspective view showing the lower mold from the upper face. In FIG. 6A, an upper mold MD1 includes an optical face transferring face MD1a corresponding to one concave part 30a and one lens face 30c, and hole transferring faces MD1b corresponding to the second annular part 30f and the third annular part 30g. On the other hand, as shown in FIG. 7, a lower mold MD2 includes an optical face transferring face MD2a corresponding to other concave part 30a and other lens face 30c, a hole transferring face MD2b corresponding to the first annular part 30e and the cylindrical part 30h, and an opening MD2c receiving injection pins IP.

Figure 6B:
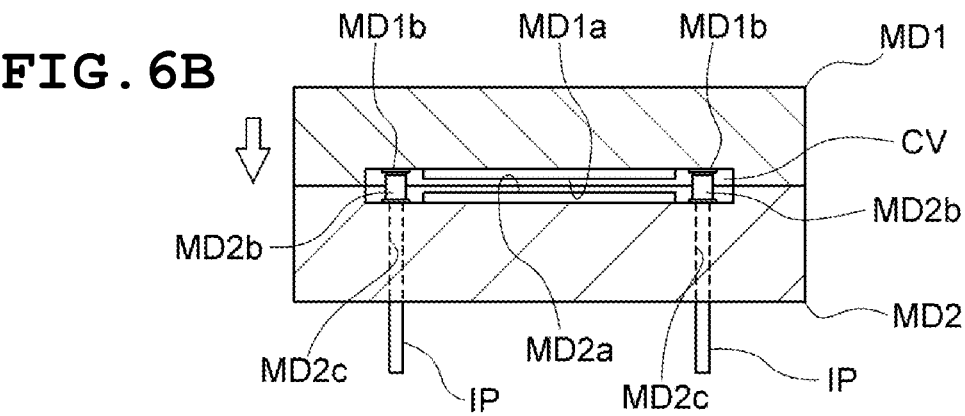
Figure 7:
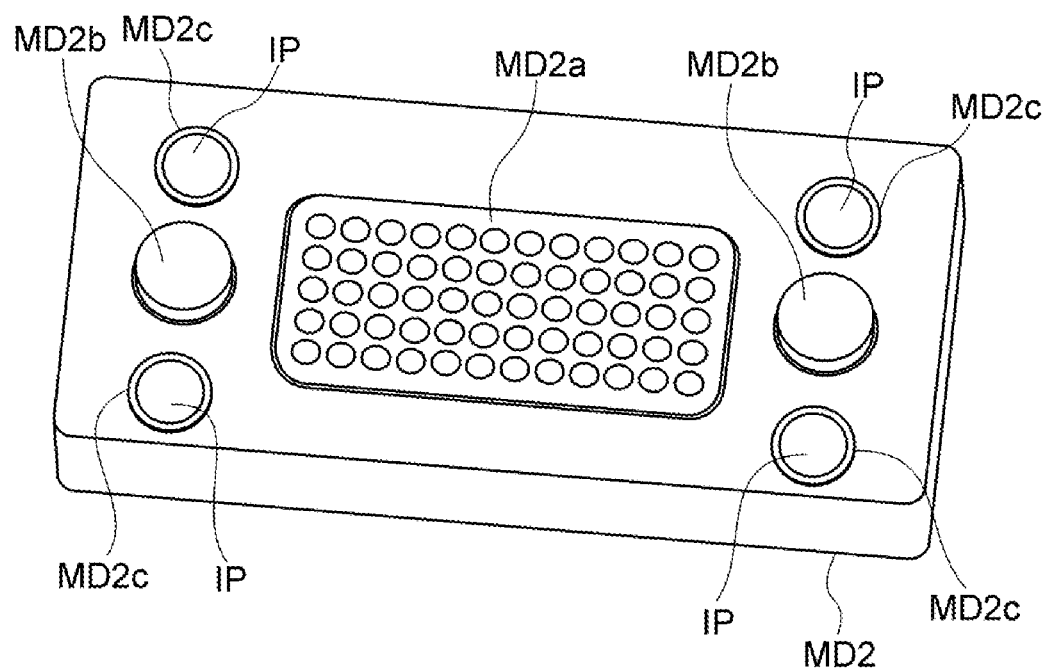
FIG. 7 is a perspective view of a lower mold according to one or more embodiments viewed from an upper face.

As shown in FIG. 6A, with receiving the injection pins IP in the opening MD2c, the optical face transferring faces MD1a and MD2a are opposed, and the hole transferring faces MD1b and MD2b are opposed, and as shown in FIG. 6B, the upper mold MD1 is made to approach to the lower mold MD2 to clamp the both molds.

To a cavity CV formed between the lower mold MD2 and the upper mold MD1 clamped, melted thermoplastic resin (for example, amorphous thermoplastic polyether imide (PEI) resin) is filled from a gate (not shown) and then is solidified.

Figure 6C:
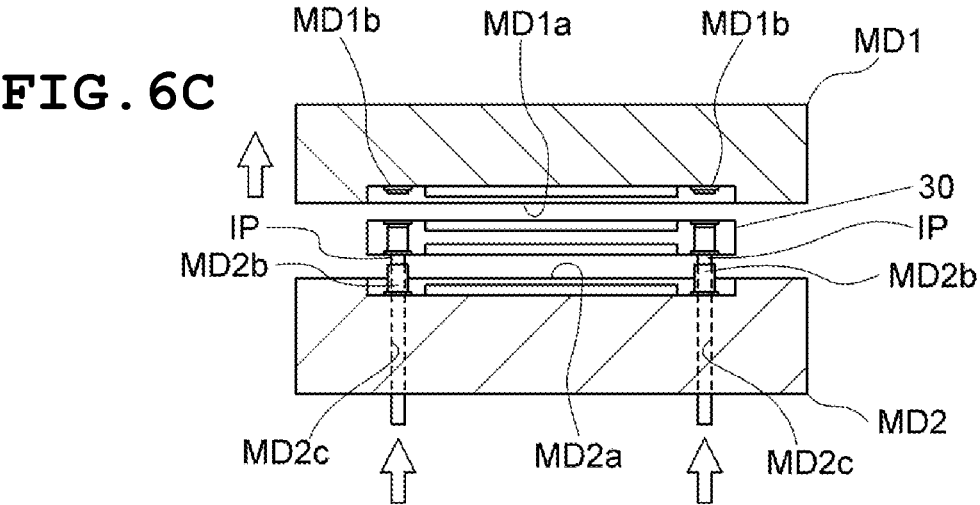

Thereafter, the upper mold MD1 is separated from the lower mold MD2, then, the ejection pins IP are projected from the opening MD2c to release the lens plate 30 formed with adhering to the lower model MD2, as shown in FIG. 6C. Here, a parting line of the circular hole 30d is located at a boundary between the second annular part 30g and the cylinder part 30h. The mark by the tip of the ejection pins IP projected on releasing of mold is the impression BR (refer to FIG. 4). As apparent from FIG. 7, the ejection pins IP are projected at both sides of the circular hole 30d, thereby allowing to release the lens plate 30 easily with suppressing breakage thereof. Then, the antireflection film 30i is formed at the post-step by vapor depositing method or the like with masking a circumference of the lens plate 30 including the circular hole 30d. The explanation about the vapor depositing method is omitted because of its publicity.

Next, assembling mode and coupling mode of the optical connector 20 will be explained. Here, as shown in FIG. 2, the end of the optical cable 10 is coupled to the end hole 21b of the ferrule 21, and the tip of the optical fiber 11 is exposed on the end face 21d. On assembling of the optical connector 20, the round shafts 22 are inserted into the circular openings 21e of the ferrule 21, then the protruded end of the round shaft 22 is engaged with the circular hole 30d of the lens plate 30, and one of the contact faces 30b is made to contact with the end face 21d of the ferrule 21. Here, because each lens face 30c is formed within the concave part 30a, the peak of the lens face does not possibly interfere with the end face 21d, thereby ensuring a predetermined clearance therebetween. Further, each lens face 30c is positioned with high accuracy with reference to a middle point between the center lines of a pair of the circular holes 30d, also the end of the optical fiber 11 held in the through hole 21c is positioned with high accuracy with reference to a middle point between the center lines of a pair of circular openings 21e, and hence, the optical axis of each lens face 30c and an end center of the optical fiber 11 opposed thereto can be coincided with high accuracy.

Further, when the optical connectors 20 are coupled, couplers 41 and 42 shown in FIG. 3 are used. The couplers 41 and 42 are respectively made into a housing shape which is opened at one end. The couplers 41 and 42 include flange parts 41a and 42a provided at the side of the opened end, and guide holes 41c and 42c provided at closed ends 41b and 42b opposite to the opened end. An engaging concave part 41d is formed on an opposing end face of the flange part 41a, and an engaging convex part 42d corresponding to the engage concave part 41d is formed on an opposing end face of the flange part 42a.

As shown in FIG. 3, the ferrules 21 are housed in the couplers 41 and 42 respectively, and the optical cables 10 are pulled out externally through the guide holes 41c and 42c. At this time, the enlarged parts 21a of the ferrules 21 engage with the inner circumference walls of the closed ends 41b and 42b thereby to position the ferrules 21 relative to the couplers 41 and 42. In this state, the lens plates 30 are exposed on the opened ends of the couplers 41 and 42.

The convex part 42d of the flange part 42a is engaged with the concave part 41d of the flange part 41a, so that the flange parts 41a and 42a are closely attached, and the contact faces 30b of the opposing lens plates 30 come into contact. Here, because each lens face 30c is formed within the concave part 30a, the peak of the lens face does not possibly interfere with each other, thereby ensuring a predetermined clearance therebetween. The engagement of the engage concave part 41d and the engage convex part 42d allows the optical axes of the opposing lens faces 30c to coincide with high accuracy. Thus, a pair of the optical connectors 20 can be coupled with high accuracy through the couplers 41 and 42. Although not shown clearly in the drawings, a clearance between the circular opening 21e of the ferrule 21 and the round shaft 22 is equal to or smaller than a clearance between the round shaft 22 and the circular hole 30d of the lens plate 30, further a clearance between the round shaft 22 and the circular hole 30d is smaller than a clearance of an area where the couplers 41, 42 and the optical cables 10 are mutually engaged.

In FIG. 3, light (for example, any one of wavelength of 850 nm, 1310 nm, and 1550 nm) propagating in the optical fibers 11 of one optical cable 10, is emitted from the end of the ferrule 21, and makes incident into one lens plate 30 in a state of diverging light, then is emitted therefrom as collimate light. The emitted collimate light makes incident into the other lens plate 30, and the converging light is emitted therefrom. This converging light is condensed at the end of the optical fiber 11 of the other ferrule 21, and is transmitted therefrom through the other optical cable 10. The diameter of the collimate light is expanded to about five times of the core diameter of the single mode optical fiber 11. Thus, even if offset of optical axes occurs between a pair of lens plates 30, the influence resulted from such offset can be inhibited.

Figure 8:
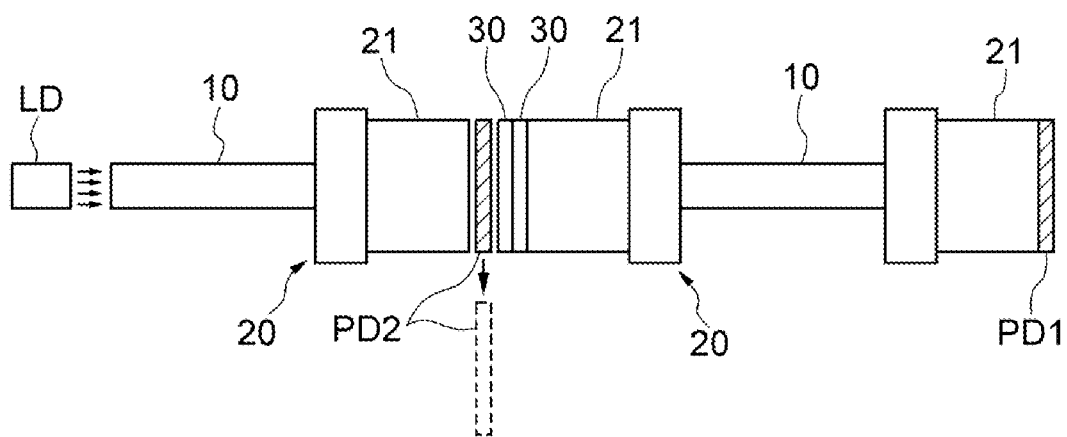
FIG. 8 is a schematic view showing a measuring system used for study.

Next, a result of study performed by the inventors will be explained. FIG. 8 is a schematic view showing the measuring system used for the study. As shown in FIG. 8, a pair of optical connectors 20 coupled to the optical cable 10 is provided such that the respective lens plates 30 are disposed in an opposed relation. A light source LD such as laser is oppositely disposed to an end of the left-hand side (upstream side) optical cable 10. On the other hand, a ferrule 21 is coupled to an end of the right-hand side (downstream side) optical cable 10, and a first optical detector PD1 is arranged at the output end of the ferrule 21. In the upstream optical connector 20, a second optical detector PD2 is disposed between the ferrule 21 and the lens plate 30. The second optical detector PD2 can be retracted from the light path.

Samples of the ferrule are prepared such that a content of the glass fiber relative to the resin as the material is changed to change the coefficient of linear expansion thereof with keeping the shape of the ferrule 21 of the optical connector 20. Specifically, the content of the glass fiber relative to the resin as the material of the ferrule 21 is 50 wt % (A), 30 wt % (B) and 10 wt % (C). In this way, the linear expansion difference between the ferrule 21 and the lens plate 30 is adjusted to 50 PPM/° C., 35 PPM/° C. and 20 PPM/° C., respectively.

On the other hand, samples of the two lens plates 30 are prepared by changing the presence/absence of the antireflection film although the shape and material of the two lens plates 30 are same. Specifically, no antireflection film is formed in any of the upstream and the downstream lens plates 30 to obtain a sample (a: each having 4% of reflectance). The antireflection film is formed on only the downstream lens plate 30 to obtain a sample (b: the upstream lens plate having 4% of reflectance, and the downstream lens plate having 1% of reflectance). The antireflection film is formed on both of the upstream and downstream lens plates 30 to obtain a sample (c: each having 1% of reflectance)

The ferrules (A) to (C) as the sample and the lens plates (a) to (c) as the sample are combined, so that light is emitted from the light source LD at normal temperature, normal temperature+35° C., and normal temperature−35° C., and the emitting light amount P0 from the upstream ferrule 21 is measured by the second optical detector PD2, then, after the second optical detector PD2 is retracted as shown by a dotted line in FIG. 8, the emitting light amount P1 from the most downstream ferrule 21 is measured by the first optical detector PD1, thereby obtaining light amount loss δ (db) using δ=10·log(P1/P0). The result is shown in Table 1.

TABLE 1

| Difference of linear expansion between lens plate and ferrule | Reflectance (upstream/downstream) | Loss Normal temperature | +35° C. | −35° C. |
|---|---|---|---|---|
| 50 PPM/° C. (A)(Content of glass fiber in ferrule: 50 wt %) | (a) 4%/4% | 2.5 db | 3.2 db | 3.1 db |
|  | (b) 4%/1% | 1.6 db | 2.1 db | 2.2 db |
|  | (c) 1%/1% | 0.7 db | 1.3 db | 1.2 db |
| 35 PPM/° C. (B)(Content of glass fiber in ferrule: 30 wt %) | (a) 4%/4% | 2.6 db | 2.9 db | 2.9 db |
|  | (b) 4%/1% | 1.5 db | 1.8 db | 1.7 db |
|  | (c) 1%/1% | 0.8 db | 1.0 db | 1.1 db |
| 20 PPM/° C. (C)(Content of glass fiber in ferrule: 10 wt %) | (a) 4%/4% | 2.6 db | 2.7 db | 2.6 db |
|  | (b) 4%/1% | 1.5 db | 1.6 db | 1.6 db |
|  | (c) 1%/1% | 0.7 db | 0.9 db | 0.8 db |

It is found in Table 1 that the loss is 2.5 db at normal temperature (20° C.) in the combination of the ferrule (A) in which the content of glass fiber relative to resin is 50 wt % and the lens plates (a) in which no antireflection film is formed, on the contrary, the loss increases to 3.2 db at the environmental temperature elevated by 35° C., and the loss increases to 3.1 db at the environmental temperature lowered by 35° C.

Meanwhile, the loss is 1.6 db at the normal temperature in the combination of the ferrule (A) in which the content of glass fiber relative to resin is 50 wt % and the lens plates (b) in which the reflection film is formed on only the downstream lens, on the contrary, the loss increases to 2.1 db at the environmental temperature elevated by 35° C., and the loss increases to 2.2 db at the environmental temperature lowered by 35° C.

On the other hand, the loss is 0.7 db at the normal temperature in the combination of the ferrule (A) in which the content of glass fiber relative to resin is 50 wt % and the lens plates (c) in which the antireflection film is formed on both lens plates, on the contrary, the loss increases to 1.3 db at the environmental temperature elevated by 35° C., and the loss increases to 1.2 db at the environmental temperature lowered by 35° C. It is found that when the allowable value of the loss at the normal temperature is 1.0 db or less, and the allowable value at temperature change of ±35° C. is the loss at normal temperature+0.2 db, the combination of the ferrule (A) in which the content of glass fiber relative to resin is 50 wt % and the lens plates (a) in which no antireflection films is formed or the lens plates (b) in which the antireflection films is formed on only the downstream lens plate, does not satisfy the allowable values even at the normal temperature. Further, in the combination of the ferrule (A) in which the content of glass fiber relative to resin is 50 wt % and the lens plates (c) in which the antireflection film is formed on both lens plates, only the case of the environmental temperature being normal temperature satisfies the allowable values. Thus, such combinations are not practical.

Next, in Table 1, the loss is 2.6 db at the normal temperature in the combination of the ferrule (B) in which the content of glass fiber relative to resin is 30 wt % and the lens plates (a) in which no antireflection film is formed, on the contrary, the loss increases to 2.9 db at the environmental temperature elevated by 35° C., and the loss increases to 2.9 db at the environmental temperature lowered by 35° C.

Meanwhile, the loss is 1.5 db at the normal temperature in the combination of the ferrule (B) in which the content of glass fiber relative to resin is 30 wt % and the lens plates (b) in which the antireflection film is formed on only the downstream lens plate, on the contrary, the loss increases to 1.8 db at the environmental temperature elevated by 35° C., and the loss increases to 1.7 db at the environmental temperature lowered by 35° C.

On the other hand, the loss is 0.8 db at the normal temperature in the combination of the ferrule (B) in which the content of glass fiber relative to resin is 30 wt % and the lens plates (c) in which the antireflection film is formed on both lens plates, on the contrary, the loss increases to 1.0 db at the environmental temperature elevated by 35° C., and the loss increases to 1.1 db at the environmental temperature lowered by 35° C. It is found that because the allowable value of the loss at the normal temperature is 1.0 db or less, and the allowable value at temperature change of ±35° C. is the loss at normal temperature+0.2 db, the combination of the ferrule (B) in which the content of glass fiber relative to resin is 30 wt % and the lens plates (a) in which no antireflection films is formed or the lens plates (b) in which the antireflection films is formed on only the downstream lens plate, does not satisfy the allowable values even at the normal temperature. Further, in the combination of the ferrule (B) in which the content of glass fiber relative to resin is 30 wt % and the lens plates (c) in which the antireflection film is formed on both lens plates, only the cases of the environmental temperature being normal temperature and being elevated by 35° C. satisfy the allowable values. Thus, such combinations are not practical.

Next, in Table 1, the loss is 2.6 db at the normal temperature in the combination of the ferrule (C) in which the content of glass fiber relative to resin is 10 wt % and the lens plates (a) in which no antireflection film is formed, on the contrary, the loss increases to 2.7 db at the environmental temperature elevated by 35° C., and the loss is 2.6 db at the environmental temperature lowered by 35° C.

Meanwhile, the loss is 1.5 db at the normal temperature in the combination of the ferrule (C) in which the content of glass fiber relative to resin is 10 wt % and the lens plates (b) in which the antireflection film is formed on only the downstream lens plate, on the contrary, the loss increases to 1.6 db at the environmental temperature elevated by 35° C., and the loss increases to 1.6 db at the environmental temperature lowered by 35° C.

On the other hand, the loss is 0.7 db at the normal temperature in the combination of the ferrule (C) in which the content of glass fiber relative to resin is 10 wt % and the lens plates (c) in which the antireflection film is formed on both lens plates, on the contrary, the loss increases to 0.9 db at the environmental temperature elevated by 35° C., and the loss increases to 0.8 db at the environmental temperature lowered by 35° C. It is found that because the allowable value of the loss at the normal temperature is 1.0 db or less, and the allowable value at temperature change of ±35° C. is the loss at normal temperature+0.2 db, the combination of the ferrule (C) in which the content of glass fiber relative to resin is 10 wt % and the lens plates (a) in which no antireflection films is formed or the lens plates (b) in which the antireflection films is formed on only the downstream lens plate, does not satisfy the allowable values even at the normal temperature. However, in the combination of the ferrule (C) in which the content of glass fiber relative to resin is 10 wt % and the lens plates (c) in which the antireflection film is formed on both lens plates, all the case of the environmental temperature being normal temperature and being changed by ±35° C. satisfy the allowable values. Thus, such combinations are practical.

It is found from the above result that where the coefficient of linear expansion of the ferrule is indicated as A (PPM/° C.), and the coefficient of linear expansion of the lens plate is indicated as B (PPM/° C.), the value of (B−A) is desirably 20 (PPM/° C.). On the other hand, the glass fiber is contained in the resin which is the lens plate material, thereby making B to be near A, however, if B=A, the lens plate is colored to decrease the optical transmittance thereof, resulting that the loss is generated. For this reason, the following formula is satisfied, thereby obtaining one condition for reducing the loss.

$$0 < B - A \leq 20 \quad (1)$$

The other condition for reducing the loss is to suppress the reflectance to 1% or less, by providing the antireflection film or the like in the lens face of the lens plate.

Hereinafter, non-limiting examples of the antireflection film produced by the inventors will be described. The examples 1 to 3 are produced by the vapor-depositing method with changing a spectrum characteristic so that a high refractive-index layer and a low refractive-index layer are superposed on a resin base material in four layers each having a thickness shown in Table 2. ULTEM (registered trademark) is used as the resin base material. The high refractive-index layer is OA600 (produced by Canon Optron Inc.) which is a mixture of $Ta_2O_5$, TiO and $Ti_2O_5$, the concrete composition of the high refractive-index layer being $Ta_2O_5$ of 90% by weight or more, TiO of 10% by weight or less, and $Ti_2O_5$ of 10% by weight or less. On the other hand, the low refractive-index layer is Substance L5 (produced by Merck Inc.) which is a mixture of $SiO_2$ and $Al_2O_3$, the concrete composition of the low refractive-index layer being $SiO_2$ of 97% by weight, and $Al_2O_3$ of 3% by weight. For film formation, a film forming apparatus ACE-1350 manufactured by Synchron Inc. is used. In such apparatus, a heating temperature is set in 120, and a start degree of vacuum is set in 3.00E-3 Pa.

TABLE 2

| | Layer Air | Film thickness d(nm) | | |
|---|---|---|---|---|
| | | Example 1 | Example 2 | Example 3 |
| 4 | Substance L5 | 174.2 | 269.0 | 318.3 |
| 3 | OA600 | 73.5 | 115.9 | 137.3 |
| 2 | Substance L5 | 63.1 | 199.2 | 118.6 |
| 1 | OA600 /ULTEM substrate/ | 22.0 | 34.5 | 40.9 |

A film forming speed RATE (Å/SEC) of each layer is set in a value shown in Table 3. Oxygen gas is introduced on the film formation of the high refractive-index layer, but oxygen gas is not introduced on the film formation of the low refractive-index layer.

TABLE 3

| | Film forming formulation | | |
|---|---|---|---|
| | RATE(Å/sec) | Gas introducing amount (Pa) | Reflective index |
| OA600 | 3.0 | 1.20E−02 | 2.0318 |
| Substance L5 | 5.0 | None | 1.4639 |
| ULTEM substrate | — | — | 1.6665 |

Here, the refractive indexes n (λ) in Table 3 are obtained by substituting numerical values of Table 4 for the following formula. The refractive indexes are measured by d line (wavelength λ=587.56 nm) in this specification. $n(\lambda) = A0 + A1/\lambda^2 + A2/\lambda^4$

TABLE 4

| | n(λ) | | | |
|---|---|---|---|---|
| | A0 | A1 | A2 | 587.56 |
| ULTEM substrate | 1.6292 | 0.0069 | 0.0020 | 1.6665 |
| OA600 | 1.9681 | 0.0191 | 0.0010 | 2.0318 |
| Substance L5 | 1.4438 | 0.0069 | 0.0000 | 1.4639 |

Figure 9:
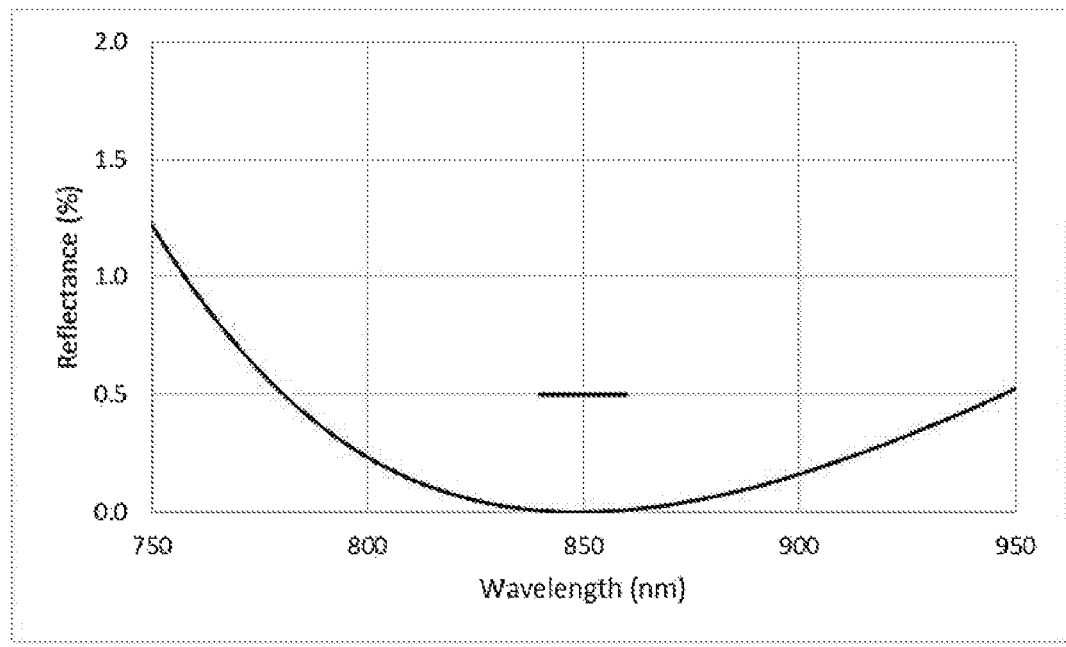
FIG. 9 shows a view showing a spectrum characteristic of an antireflection film according to an example 1.
Figure 10:
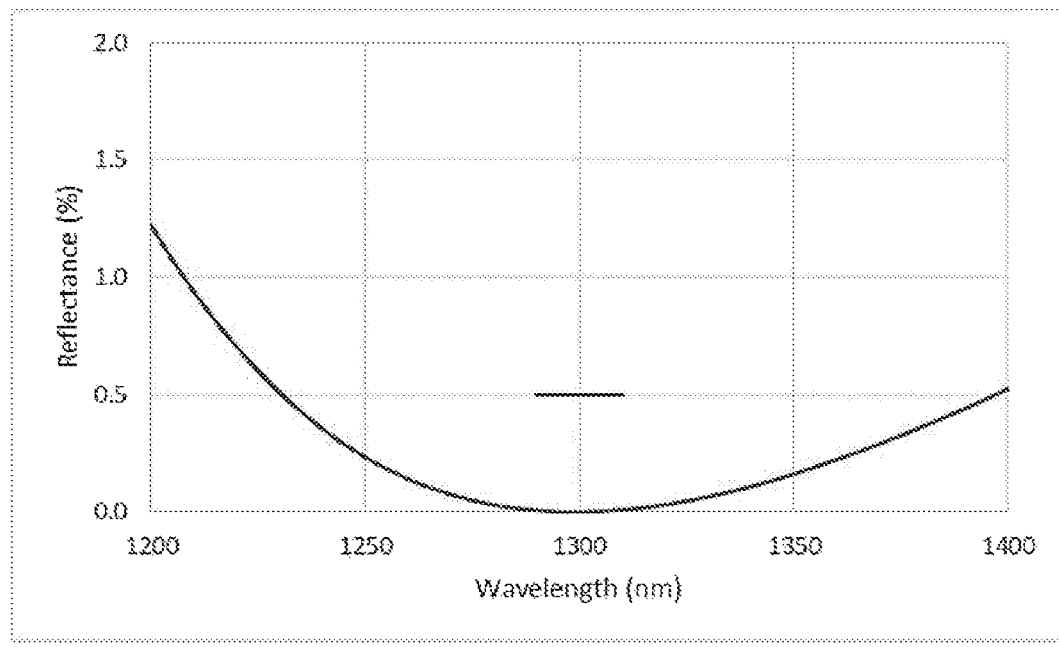
FIG. 10 shows a view showing a spectrum characteristic of an antireflection film according to an example 2.
Figure 11:
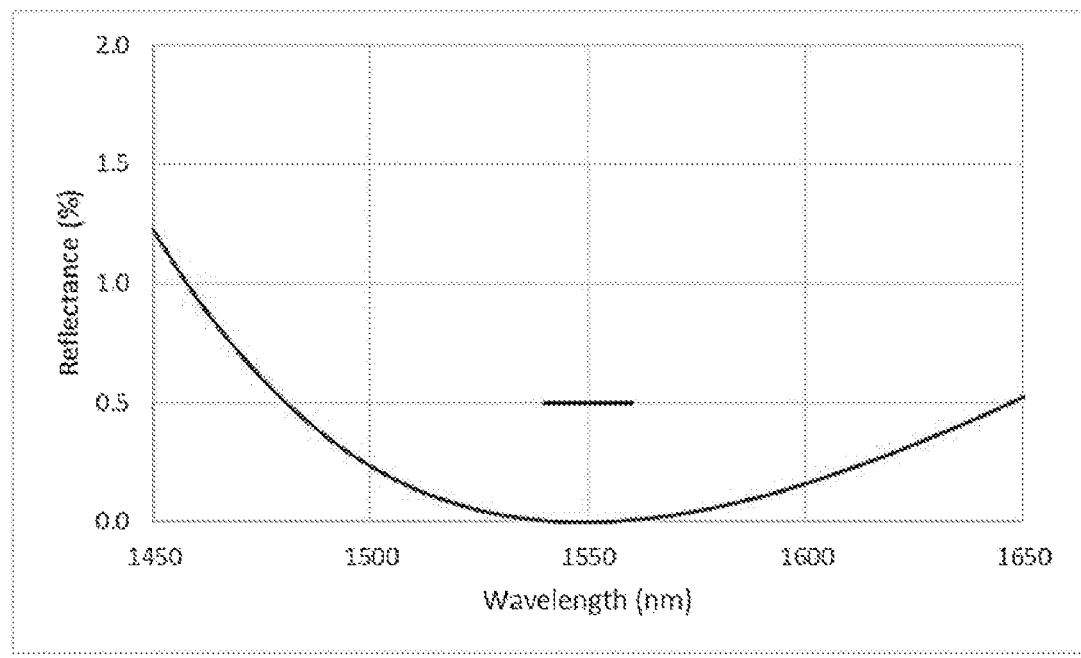
FIG. 11 shows a view showing a spectrum characteristic of an antireflection film according to an example 3.

The spectral characteristics of the antireflection film thus formed is shown in FIGS. 9 to 11 in which vertical an axis indicates a reflectance and a horizontal axis indicates a wavelength. In example 1, as shown in FIG. 9, the reflectance can be suppressed to 0.5% or less for light having wavelength of 780 nm to 950 nm. In example 2, as shown in FIG. 10, the reflectance can be suppressed to 0.5% or less for light having a wavelength of 1230 nm to 1400 nm. Further, in example 3, as shown in FIG. 11, the reflectance can be suppressed to 0.5% or less for light having a wavelength of 1480 nm to 1650 nm. That is, these non-limiting examples can suppress the reflectance of light having the wavelength of 850 nm, 1310 nm and 1550 nm for communication to 0.5% or less.

Although the disclosure has been described with respect to only a limited number of embodiments, those skilled in the art, having benefit of this disclosure, will appreciate that various other embodiments may be devised without departing from the scope of the present invention. For example, the antireflection structure is not limited to the antireflection film, but can include any type of antireflection structure having the reflectance of 2% or less. For example, fine structures such as moth eye provided on a lens surface can realize such antireflection structure. Accordingly, the scope of the invention should be limited only by the attached claims.

The invention claimed is:

1. An optical connector for connecting single mode optical fibers, comprising:
   a ferrule that connects to and holds an optical fiber, and
   a resin optical element coupled to the ferrule and that comprises a lens positioned relative to an end of the optical fiber held in the ferrule, wherein
   the lens comprises a first lens face on a first side of the optical element and a second lens face on a second side of the optical element that opposes the first side,
   the optical element has a contact face projected a predetermined distance from the first lens face to form a first concave portion that is recessed into the first side of the optical element,
   the first lens face is a curved surface of the optical element that is disposed within the first concave portion,
   the second lens face is a curved surface of the optical element that is disposed within a second concave portion that is recessed into the second side of the optical element,
   the lens is provided with an antireflection structure,
   when the optical connector is oppositely connected to another identical optical connector:
      the opposing optical elements are disposed such that a diverging light is emitted from the end of the optical fiber, transmitted through the lens, and emitted as a collimated beam of light, and
      the collimated beam of light is incident on an opposing lens of the opposing, identical optical connector and condensed onto an end of an opposing optical fiber of the opposing, identical optical connector, and
   Expression (1) is satisfied:

$$0 < B - A \leq 20 \qquad (1),$$

where $A$ (PPM/° C.) is a coefficient of linear expansion of the ferrule and $B$ (PPM/° C.) is a coefficient of linear expansion of the optical element.

2. The optical connector according to claim 1, wherein the lens has a convex shape, and
   when the optical connectors are oppositely connected, the contact faces of the optical connectors contact one another.

3. The optical connector according to claim 1, wherein the antireflection structure is an antireflection film formed on the entirety of the concave portion.

4. The optical connector according to claim 3, wherein
   the ferrule comprises a shaft,
   the optical element comprises a hole,
   the shaft is engaged to the hole to position the optical element relative to the ferrule, and
   the antireflection film is formed on an area other than the hole.

5. The optical connector according to claim 1, wherein a plurality of optical fibers are provided, and a plurality of lenses are provided.

* * * * *